US010067983B2

(12) United States Patent
Akula et al.

(10) Patent No.: US 10,067,983 B2
(45) Date of Patent: Sep. 4, 2018

(54) ANALYZING TICKETS USING DISCOURSE CUES IN COMMUNICATION LOGS

(71) Applicant: International Business Machines Corporation, Armonk, NY (US)

(72) Inventors: Arjun R. Akula, Bangalore (IN); Gaargi B. Dasgupta, Bangalore (IN); Tapan K. Nayak, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 14/958,158

(22) Filed: Dec. 3, 2015

(65) Prior Publication Data
US 2017/0161335 A1   Jun. 8, 2017

(51) Int. Cl.
| G06F 17/00 | (2006.01) |
| G06F 17/30 | (2006.01) |
| G06F 17/27 | (2006.01) |
| H04L 12/24 | (2006.01) |

(52) U.S. Cl.
CPC ...... *G06F 17/30528* (2013.01); *G06F 17/279* (2013.01); *G06F 17/30958* (2013.01); *H04L 41/5074* (2013.01)

(58) Field of Classification Search
CPC .............. G06F 3/067; G06F 17/30091; G06F 17/30174; G06F 17/302; G06F 3/0619; G06F 3/0644
See application file for complete search history.

(56) References Cited

U.S. PATENT DOCUMENTS

| 8,527,811 B2 | 9/2013 | Gilbert et al. |
| 8,655,803 B2 | 2/2014 | Lecerf et al. |
| 8,768,921 B2 | 7/2014 | Ghosal et al. |
| 2009/0055684 A1 | 2/2009 | Jamjoom et al. |
| 2013/0036062 A1 | 2/2013 | Natarajan et al. |

(Continued)

OTHER PUBLICATIONS

Brants, T. TnT—A Statistical Part-of-Speech Tagger, Proceedings of the Sixth Applied Natural Language Processing Conference, ANLP 2000.

(Continued)

*Primary Examiner* — Truong Vo
(74) *Attorney, Agent, or Firm* — Ryan, Mason & Lewis, LLP

(57) ABSTRACT

Methods, systems, and computer program products for analyzing tickets using discourse cues in communication logs are provided herein. A computer-implemented method includes analyzing a plurality of communication logs associated with a query related to an information technology issue to determine one or more discourse relationships between the plurality of communication logs; generating a hierarchical structure representing the plurality of communication logs and the one or more determined discourse relationships; associating the query with one or more classified queries by (i) determining one or more patterns in the hierarchical structure and (ii) comparing the one or more determined patterns to patterns associated with multiple historical hierarchical structures associated with classified queries; and determining one or more information technology issue categories applicable to the query based on said associating.

19 Claims, 8 Drawing Sheets

(56) References Cited

U.S. PATENT DOCUMENTS

2014/0280018 A1* 9/2014 Braudes ................ G06F 17/30 707/713

OTHER PUBLICATIONS

Dasgupta et al., Towards Auto-Remidiation in Services Delivery: Context-based Classification of Noisy and Unstructured Tickets, 2014.

Agarwal et al., SmartDispatch: Enabling Efficient Ticket Dispatch in an IT Service Environment, KDD'12, Aug. 12-16, 2012.

Gadde et al., Adapting a WSJ trained Part-of-speech Tagger to Noisy Text: Preliminary Results, J-MOCR-AND 2011.

Gupta et al., "A novel approach towards building a portable nlidb system using the computational paninian grammar framework." In Asian Language Processing (IALP), 2012 International Conference on, pp. 93-96. IEEE, 2012.

Sun et al., "Discourse processing for context question answering based on linguistic knowledge." Knowledge-Based Systems 20.6 (2007): 511-526.

Li et al., "Improving Text Normalization via Unsupervised Model and Discriminative Reranking." ACL (Student Research Workshop). 2014.

Brill et al., "An improved error model for noisy channel spelling correction." Proceedings of the 38th Annual Meeting on Association for Computational Linguistics. Association for Computational Linguistics, 2000.

Bertoldi et al., "Statistical Machine Translation of Texts with Misspelled Words". In Human Language Technologies: The 2010 Annual Conference of the North American Chapter of the ACL, pp. 412-419, Los Angeles, California, Jun. 2010.

Wong et al., "Enhanced integrated scoring for cleaning dirty texts." arXiv preprint arXiv:0810.0332 (2008).

Li, H. et al., "Information Retrieval Technology", In 4th Asia Information Retrieval Symposium, AIRS 2008, Harbin, China, Jan. 15-18, 2008.

Chang et al., "Disambiguating DE for Chinese-English machine translation." Proceedings of the Fourth Workshop on Statistical Machine Translation. Association for Computational Linguistics, 2009.

Foster et al., "Adapting a WSJ-trained parser to grammatically noisy text." Proceedings of the 46th Annual Meeting of the Association for Computational Linguistics on Human Language Technologies: Short Papers. Association for Computational Linguistics, 2008.

* cited by examiner

502

| Computation of LRG |
|---|
| 1: $DG \leftarrow$ Discourse Graph |
| 2: $n_i \leftarrow i^{th}$ node in $DG$ |
| 3: $r_{ij} \leftarrow$ discourse relationships between nodes $n_i$ and $n_j$ in $DG$ |
| 4: $node\_position_{ij} \leftarrow 0$ |
| 5: $N \leftarrow$ total number of nodes in $DG$ |
| 6: $i \leftarrow 1$ |
| 7: while $i < N - 1$ do ▷ For each node in $DG$ |
| 8:  $j \leftarrow i + 1$ ▷ get the adjacent node of $n_i$ |
| 9:  if $r_{ij}$ is Contrast or Uni-directional then |
| 10:   if direction of the discourse relation $r_{ij}$ is towards node $n_i$ then |
| 11:    $node\_position_{ij} = -1$ |
| 12:   else |
| 13:    $node\_position_{ij} = 1$ |
| 14:   end if |
| 15:  else if $r_{ij}$ is Enrichment or Independence then |
| 16:   $node\_position_{ij} = 0$ |
| 17:  end if |
| 18: end while |

| Computation of Reliability Factor in LRG |
|---|
| 1: $LRG \leftarrow$ Log Reliability Graph |
| 2: $n_i \leftarrow i^{th}$ node in $LRG$ |
| 3: $r_{ij} \leftarrow$ discourse relationships between nodes $n_i$ and $n_j$ in $DG$ |
| 4: $L \leftarrow$ total number of distinct levels in $LRG$ |
| 5: reliability_factor$_i \leftarrow 0$ ▷initialize reliability factor of each node $n_i$ in $DC$ with 0 |
| 6: $i \leftarrow 1$ |
| 7: while $i < L$ do ▷ For each level in $LRG$ |
| 8:    $N_i \leftarrow$ nodes in the level $L_i$ |
| 9:    $j \leftarrow 1$ |
| 10:    while $j < N_i$ do ▷ For each node $n_j$ in level $L_i$ |
| 11:       $C_j \leftarrow$ children of node $n_j$ |
| 12:       $k \leftarrow 1$ |
| 13:       while $k < C_j$ do ▷ nodes $n_k$ in $C_3$ can be in level $L$ or $L-1$ |
| 14:          if $r_{jk}$ is Contrast then |
| 15:             reliability_factor$_k$ = reliability_factor$_j$ + weight_contrast |
| 16:          else if $r_{jk}$ is Uni-directional then |
| 17:             reliability_factor$_k$ = reliability_factor$_j$ + weight_unidirectional |
| 18:          else if $r_{jk}$ is Enrichment then |
| 19:             reliability_factor$_j$ = reliability_factor$_j$ + weight_enrichment |
| 20:             reliability_factor$_k$ = reliability_factor$_k$ + weight_enrichment |
| 21          else if $r_{jk}$ is Independence then |
| 22:             both reliability_factor$_j$ and reliability_factor$_k$ remains unchanged. |
| 23          end if |
| 24:       end while |
| 25:    end while |
| 26: end while |

FIG. 6

ANALYZING TICKETS USING DISCOURSE CUES IN COMMUNICATION LOGS

FIELD

The present application generally relates to information technology (IT), and, more particularly, to ticket analysis techniques.

BACKGROUND

In human-intensive business processes such as IT incident management, failures and/or issues are commonly reported by customers as service requests. Service groups can analyze such requests and write observations in the form of communication logs. Such logs are commonly manually summarized by service practitioners as problem tickets. Communication logs can capture details of service groups that logged observations, such as, for example, the name of an owner group, a time-stamp, and the order of owner groups in which observations are logged. Ticket analysis can help create problem diagnostics, as well as predict outages and prevent one or more issues. However, practitioners can often write incomplete, incorrect or abbreviated observations. Such flaws in ticket descriptions can render ticket analysis challenging and inefficient.

SUMMARY

In one embodiment of the present invention, techniques for analyzing tickets using discourse cues in communication logs are provided. An exemplary computer-implemented method can include steps of analyzing a plurality of communication logs associated with a query related to an information technology issue to determine one or more discourse relationships between the plurality of communication logs, wherein each of the plurality of communication logs comprises (i) a description of one or more actions taken in connection with the information technology issue, (ii) a status related to the one or more actions taken, and (iii) identification of a group carrying out the one or more actions; generating a hierarchical structure representing the plurality of communication logs and the one or more determined discourse relationships; associating the query with one or more classified queries by (i) determining one or more patterns in the hierarchical structure and (ii) comparing the one or more determined patterns to patterns associated with multiple historical hierarchical structures associated with classified queries; and determining one or more information technology issue categories applicable to the query based on the associating step.

In another embodiment of the invention, an exemplary computer-implemented method can include normalizing text of multiple communication logs associated with a query related to an information technology issue, wherein each of the multiple communication logs comprises (i) a description of one or more actions taken in connection with the information technology issue, (ii) a status related to the one or more actions taken, and (iii) identification of a group carrying out the one or more actions. The method can also include analyzing the multiple normalized communication logs to determine multiple discourse relationships between the multiple normalized communication logs, and associating the query with one or more historical classified queries by (i) determining one or more features in the multiple determined discourse relationships and (ii) comparing the one or more determined features to features associated with multiple historical classified queries. Further, the method can include determining one or more information technology issue categories applicable to the query based on said associating.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 5 is a diagram illustrating an algorithm to derive a log reliability graph (LRG) from a discourse graph, according to an exemplary embodiment of the invention;

FIG. 6 is a diagram illustrating an algorithm to compute a reliability factor (RF) of each node in an LRG, according to an exemplary embodiment of the invention;

DETAILED DESCRIPTION

As described herein, an embodiment of the present invention includes analyzing tickets using discourse cues in communication logs. Discourse analysis in linguistics can apply to analysis of written or vocal text by examining coherency of sentences, turns-at-talk, etc. to deduce characteristics of the conversant. At least one embodiment of the invention includes using such techniques on logs to derive deeper semantic information.

For example, one or more embodiments of the invention can include leveraging communication logs, in the absence of domain keywords in ticket descriptions, to derive contextual insights into the ticket. Moreover, at least one embodiment of the invention includes associating unclassified tickets with classified tickets using discourse relationships among relevant communication logs, and determining one or more problem categories of unclassified tickets based on a learning model.

As further detailed herein, at least one embodiment of the invention includes using communication logs to capture a problem context by relating the interactions in the communication log with one or more discourse relationships. Such deduced discourse relations can subsequently be used to determine a relevant problem category. One or more embodiments of the invention additionally include representing communication logs and deduced discourse relationships in a hierarchical structure referred to herein as a log reliability graph (LRG). Using this hierarchical structure, such embodiments can further include measuring the contextual importance of communication logs, thereby deducing features that help in problem determination and ticket classification.

Figure 1:
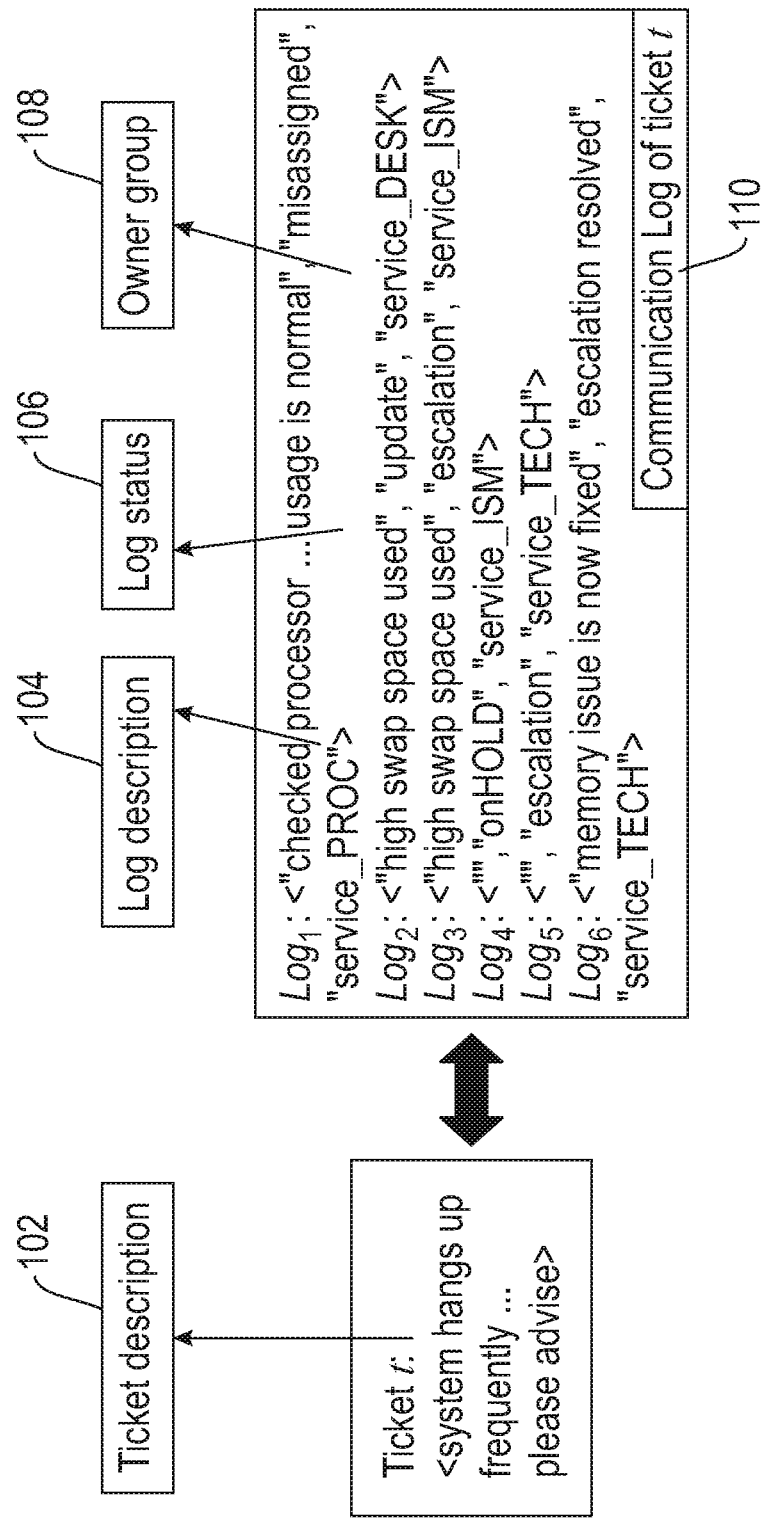
FIG. 1 is a diagram illustrating a sample ticket and its communication log, according to an exemplary embodiment of the invention.

FIG. 1 is a diagram illustrating a sample ticket and its communication log, according to an exemplary embodiment of the invention. By way of illustration, FIG. 1 depicts a ticket description 102 of ticket t, and a communication log 110 of ticket t, which includes a log description 104, a log status 106, and an owner group identification 108. Owner groups, as used herein, refer to specialized teams that manage various IT components such as middleware, databases, access controls, etc.

Figure 2:
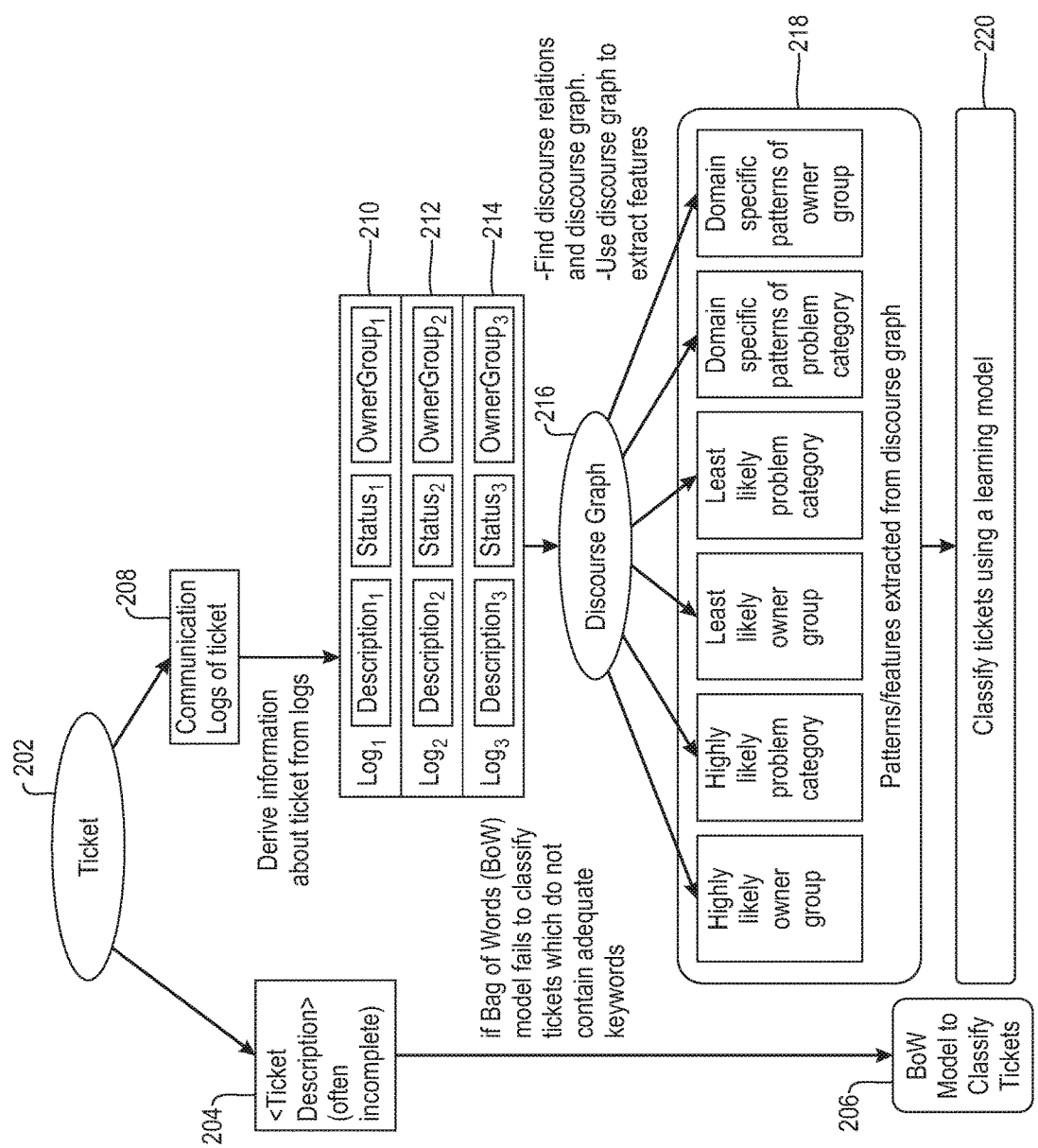
FIG. 2 is a diagram illustrating system architecture, according to an exemplary embodiment of the invention.

FIG. 2 is a diagram illustrating system architecture, according to an embodiment of the invention. As depicted in FIG. 2, ticket t 202 will be unclassified if a model 206 based on ticket description (such as, for example, a Bag-of-Words (BoW) model) cannot determine the problem category (due, for example, to long sentences and/or long strings of text) from the ticket description 204. This can be attributed, for example, to the fact that most of the tickets may contain incomplete text descriptions. A naïve method can include adding all of the text from communication logs to the BoW model. However, such a method may not work well because (i) communication logs commonly contain keywords of more than one classification category, and/or (b) due to the discourse-based nature of the logs, the logs have to be within context and not determined merely as individual keywords.

In FIG. 1, the ticket t can be initially unclassified by a BoW Model as it (t) contains an incomplete text description; that is, ticket t does not clearly state the reasons for which the system has hung up. A system can hang due to many reasons, such as high memory usage issues, high processor usage issues, etc. In accordance with one or more embodiments of the invention, the reason for this problem can be determined from the context recorded in the communication logs. Referring again to FIG. 1, in $Log_1$ of communication log 110, service group SERVICE PROC confirmed that processor is not the reason for the system hang-up. From $Log_2$ of the communication log 110, it is evident that the system hung-up due to memory issues, as the service group SERVICE DESK confirmed that high swap space usage has been observed. When run naively on concatenated communication logs, a keyword classification would likely fall short of correct disambiguation.

Also, in one or more embodiments of the invention, an alternative manner in which to encapsulate such semantics can include using a rule engine that encodes the following: "$Log_1$ suggests that the issue is NOT a processor issue" because $Log_1$ contains the keyword "normal," and "$Log_2$ suggests that the issue IS a memory issue," as $Log_2$ contains the keyword "high."

Accordingly, an example embodiment of the invention (such as depicted in FIG. 2) can include leveraging relationships among communication logs 208, which can include multiple logs such as $Log_1$ 210, $Log_2$ 212 and $Log_3$ 214 (each of which include a description, a status and an owner group) to obtain and/or determine addition cues about the issue/problem. As detailed herein, such an embodiment can include implementing novel discourse relationships among communication logs to derive cues related to the issue/problem. This can include determining discourse relations and generating a related discourse graph 216, which can then be used to extract patterns and/or features 218 that can be used to classify the ticket using a learning model 220.

At least one embodiment of the invention can include relating communication logs via use of discourse relations between the owner (or service) groups. In one or more embodiments of the invention, an interaction between owner groups can be mapped to one of the following discourse relationships: (i) contrast relation, (ii) enrichment relation, (iii) uni-directional existence relation, and (iv) independence relation. The logs and the discourse relations can subsequently be represented in the form of a discourse graph. For each ticket, individual log entities form the vertices and the discourse relationships form the directed edges in the discourse graph. The directions of the edges depend on the nature of the identified relation type.

With respect to a contrast relation, in a discourse graph, if owner group 1 and owner group 2 highlight different problem categories in their respective log description, then the relationship between their corresponding logs ($Log_1$ and $Log_2$, for instance) will be labeled as a contrast relation. With respect to an enrichment relation, in a discourse graph, if owner group 1 and owner group 2 highlight the same problem categories in their respective log description, then the relationship between their corresponding logs ($Log_1$ and $Log_2$, for instance) will be labeled as an enrichment relation. With respect to a uni-directional existence relation, in a discourse graph, if owner group 1 does not contradict the problem category highlighted by owner group 2, then the relationship between their corresponding logs ($Log_1$ and $Log_2$, for instance) will be labeled as a uni-directional existence relation. With respect to an independence relation, in a discourse graph, if owner group 1 neither contradicts nor supports the problem category highlighted by owner group 2, then the relationship between their corresponding logs ($Log_1$ and $Log_e$, for instance) will be labeled as an independence relation.

In communication logs, discourse relations can be derived, for example, by using fields such as "Log_Status" and "Log_Description." Example rules to derive discourse relations using a "Log_Status" field can include the following: a) if the "Log_Status" is changed from "mis-assigned" to "update," then the change implies a contrast relationship; and (b) if the "Log_Status" is changed from "update" to "on hold," then the change implies an independence relationship. Similarly, using descriptions of logs, at least one embodiment of the invention can include obtaining information as to whether certain logs are supporting each other, opposing each other, etc. For example, consider the following descriptions of two logs (d1 and d2):

d1: "Swap space usage is high, but no issues found with disk usage. So it might be a memory issue."

d2: "Found that random access memory (RAM) usage is exceedingly high. It is a memory issue."

From the above two log descriptions, it is noted that the service group of log description d2 is affirming the observations made by the service group of log description d1, which indicates that the relationship between the service groups of d1 and d2 is an enrichment relationship.

Additionally, at least one embodiment of the invention includes associating unclassified tickets with classified tickets using one or more cues and/or features. Example features can include the following. An owner group name of the last log will be more reliable, as the ticket is resolved by that owner group. Also, the combination of problem categories and discourse relationships can provide insights on a "highly probable problem category," the "least probable problem category," etc. At least one embodiment of the invention can also include extracting patterns (as sub-graphs of a discourse graph, for example) from historical information, and using such patterns as features (both from the perspective of owner group and problem category). In addition, one or more embodiments of the invention can include using features such as platform name, application name, company name and/or product name.

Figure 3:
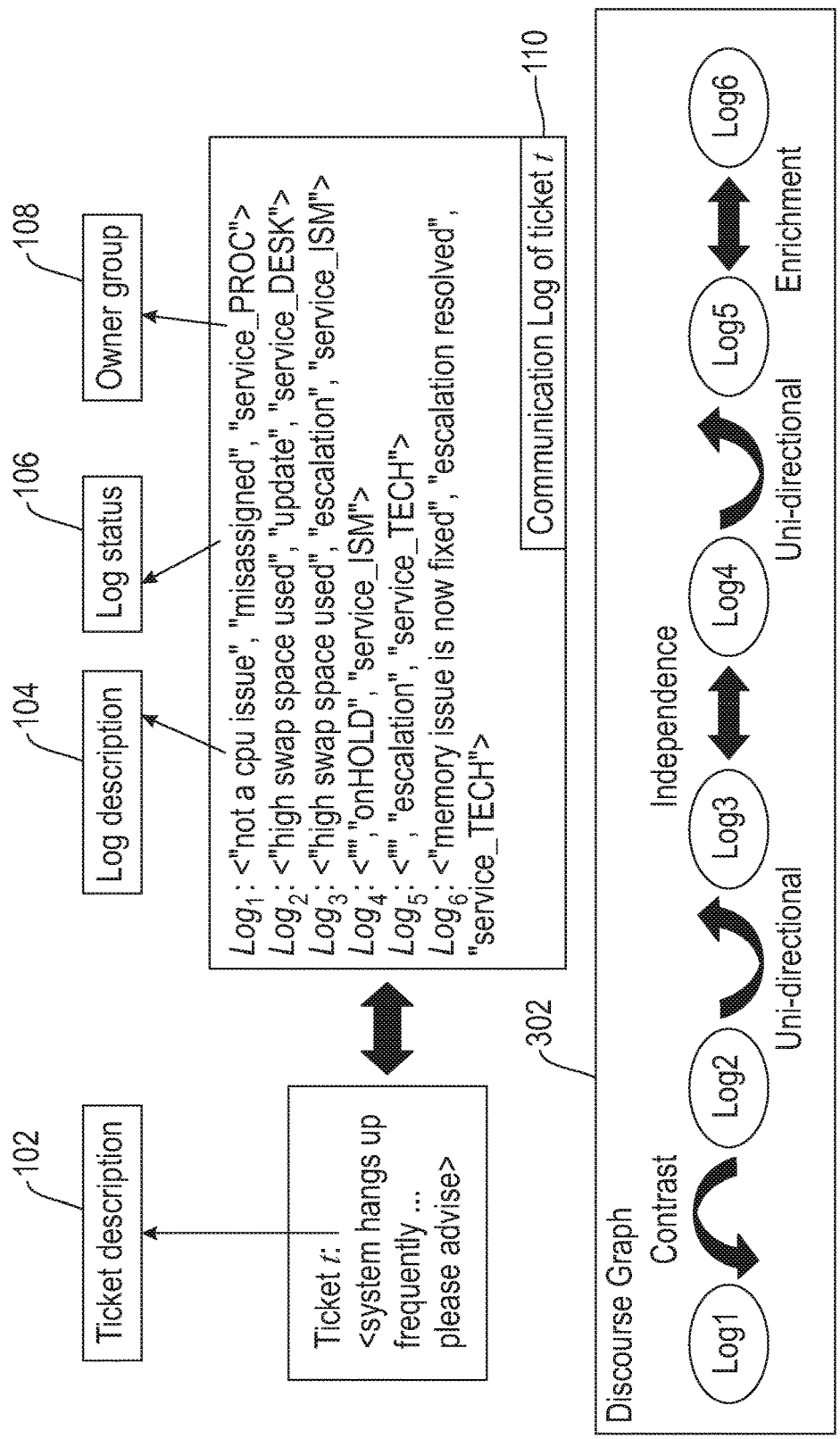
FIG. 3 is a diagram illustrating discourse relationships between communication logs, according to an exemplary embodiment of the invention.

FIG. 3 is a diagram illustrating discourse relationships between communication logs, according to an exemplary embodiment of the invention. By way of illustration, FIG. 3, similar to FIG. 1, depicts a ticket description 102 of ticket t, and a communication log 110 of ticket t, which includes a log description 104, a log status 106, and an owner group identification 108. FIG. 3 additionally depicts a discourse graph 302, which indicates that a contrast relationship exists between $Log_1$ and $Log_2$, a uni-directional relationship exists between $Log_2$ and $Log_3$, an independence relationship exists between $Log_3$ and $Log_4$, a uni-directional relationship exists between $Log_4$ and $Log_5$, and an enrichment relationship exists between $Log_5$ and $Log_6$.

Based on the transition of a log status, at least one embodiment of the invention can include assigning one or more discourse relationships. Additionally, for each log, a problem category can be extracted, and the extracted problem category, owner group and the one or more discourse relationships are used as cues in determining the problem category of the ticket. It can be noted that a problem category of individual logs may or may not be the same as the problem category of a ticket. As further described herein, at least one embodiment of the invention can include extracting multiple features from the discourse graph and using such features to build learning models using, for example, support vector machines (SVM). In order to extract the features from the communication logs, at least one embodiment of the invention includes identifying the logs in the discourse graph that capture the context of the ticket.

As detailed herein, to measure the contextual importance of logs, a hierarchical representation of the discourse graph (analogous to a topological sort on a directed acyclic graph (DAG) representation), referred to herein as an LRG, is implemented in accordance with one or more embodiments of the invention. In an LRG, each log is assigned a weight referred to herein as an RF, which measures the contextual similarity of the log's description with the ticket description. Also, an RF can be updated using discourse relations between nodes.

Figure 4:
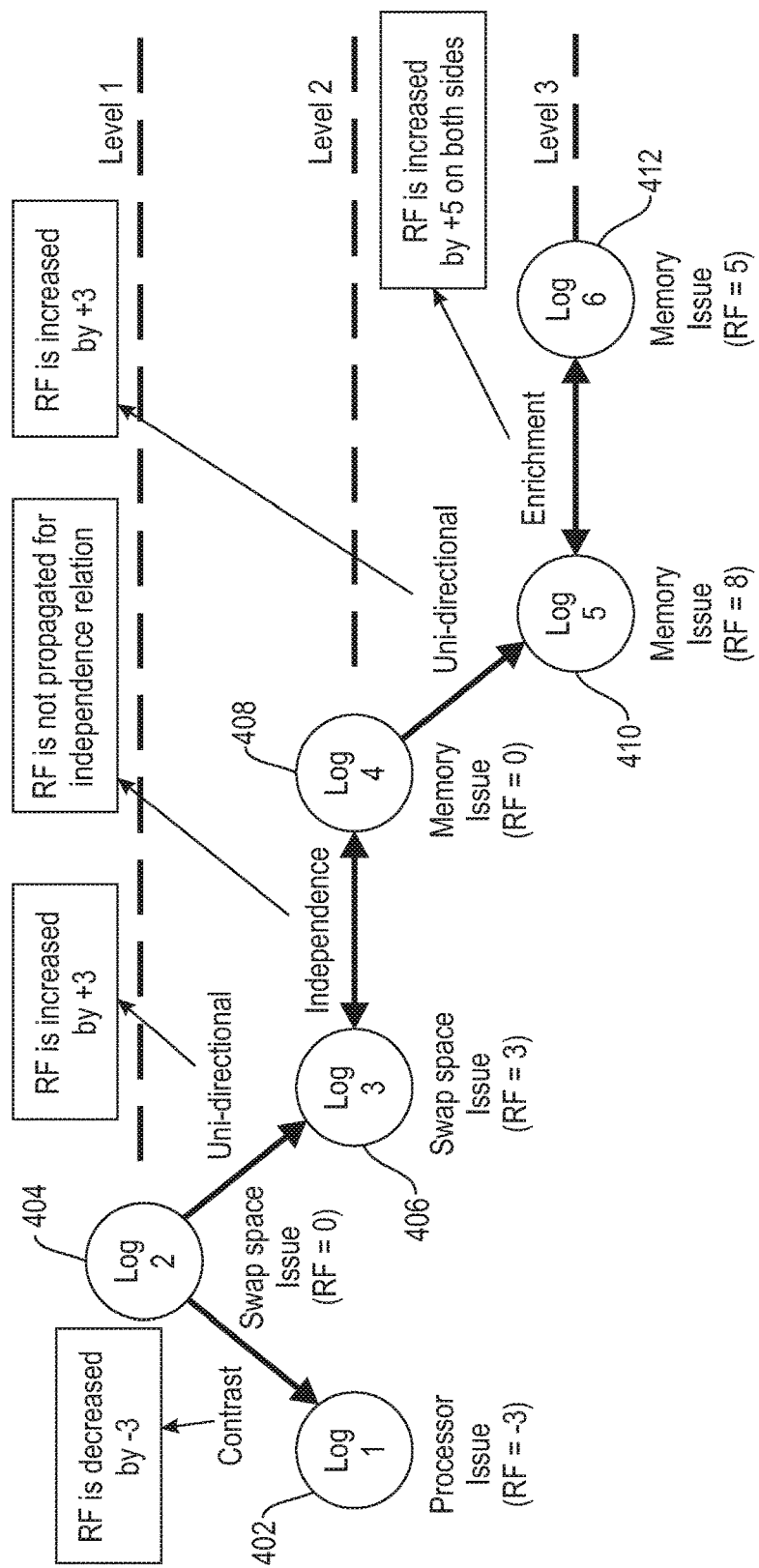
FIG. 4 is a diagram illustrating a hierarchical representation of the example discourse graph depicted in FIG. 3, according to an exemplary embodiment of the invention.

FIG. 4 is a diagram illustrating a hierarchical representation of the example discourse graph depicted in FIG. 3, according to an exemplary embodiment of the invention. By way of illustration, and as further described herein, FIG. 4 depicts $Log_1$ 402, which represents a processor issue and has an RF=−3. FIG. 4 also depicts $Log_2$ 404, which represents a swap space issue and has an RF=0. Also, FIG. 4 depicts $Log_3$ 406, which represents a swap space issue and has an RF=3. FIG. 4 further depicts $Log_4$ 408, which represents a memory issue and has an RF=0. Additionally, FIG. 4 depicts $Log_5$ 410, which represents a memory issue and has an RF=8. Further, FIG. 4 depicts $Log_6$ 412, which represents a memory issue and has an RF=5.

In at least one embodiment of the invention, one or more problem categories of each log are obtained by running a classifier on each log description. As depicted in the FIG. 4 example, note that though $Log_4$ and $Log_5$ do not contain log descriptions, their problem categories are derived by using discourse relations in the LRG. For example, because $Log_5$ is involved in an enrichment relation with $Log_6$, the problem category of $Log_6$ will be assigned to $Log_5$. Additionally, as illustrated in the FIG. 4 example, $Log_5$ is a highly reliable node, evidenced by an RF=8, and with a context that is more similar to the ticket's context than the other nodes. Also, the context of $Log_1$, having an RF=−3, is the least similar to the context of the ticket.

FIG. 5 is a diagram illustrating an algorithm 502 to derive an LRG from a discourse graph, according to an exemplary embodiment of the invention. In algorithm 502, lines 11, 13 and 16 are interpreted, respectively, as follows:

If $node\_position_{ij}=-1$, then $n_i$ will be placed a level below $n_j$ in the LRG;

If $node\_position_{ij}=1$, then node $n_i$ will be placed a level higher than node $n_j$ in the LRG; and If there is a cycle between $n_i$ and $n_j$, that is, $node\_position_{ij}=0$, then $n_i$ will be placed at the same level as $n_j$ in the LRG.

FIG. 6 is a diagram illustrating an algorithm 602 to compute a reliability factor of each node in an LRG, according to an exemplary embodiment of the invention. In the example LRG depicted in FIG. 4, the following values are used to update RFs: (i) weight_contrast=−3; (ii) weight_unidirectional=+3; and (iii) weight_enrichment=+5. As such, at least one embodiment of the invention includes deriving features from an LRG using a reliability factor. Once reliability factors are computed, such an embodiment includes extracting the following features from the LRG: (i) the owner group name of a highly reliable log ($Log_5$'s owner group in FIG. 4, for example), (ii) the owner group name of the least reliable log ($Log_1$'s owner group in FIG. 4, for example), (iii) a highly likely problem category ($Log_5$'s problem category in FIG. 4, for example), and (iv) the least likely problem category ($Log_1$'s problem category in FIG. 4). Also, such an embodiment can include extracting patterns (as sub-graphs of the discourse graph, for example) from historical information, and utilizing such patterns as features (both from the perspective of an owner group and a problem category). Additionally, at least one embodiment of the invention includes using features such as platform name, application name, company name and/or product name.

Once the features are extracted, learning models such as SVM can be used to learn one or more dependencies between the features. Dependencies between features can be used, for example, to identify the classification category of a ticket from partial communication logs, as well as to predict the most likely routing path from partial communication logs.

Figure 7:
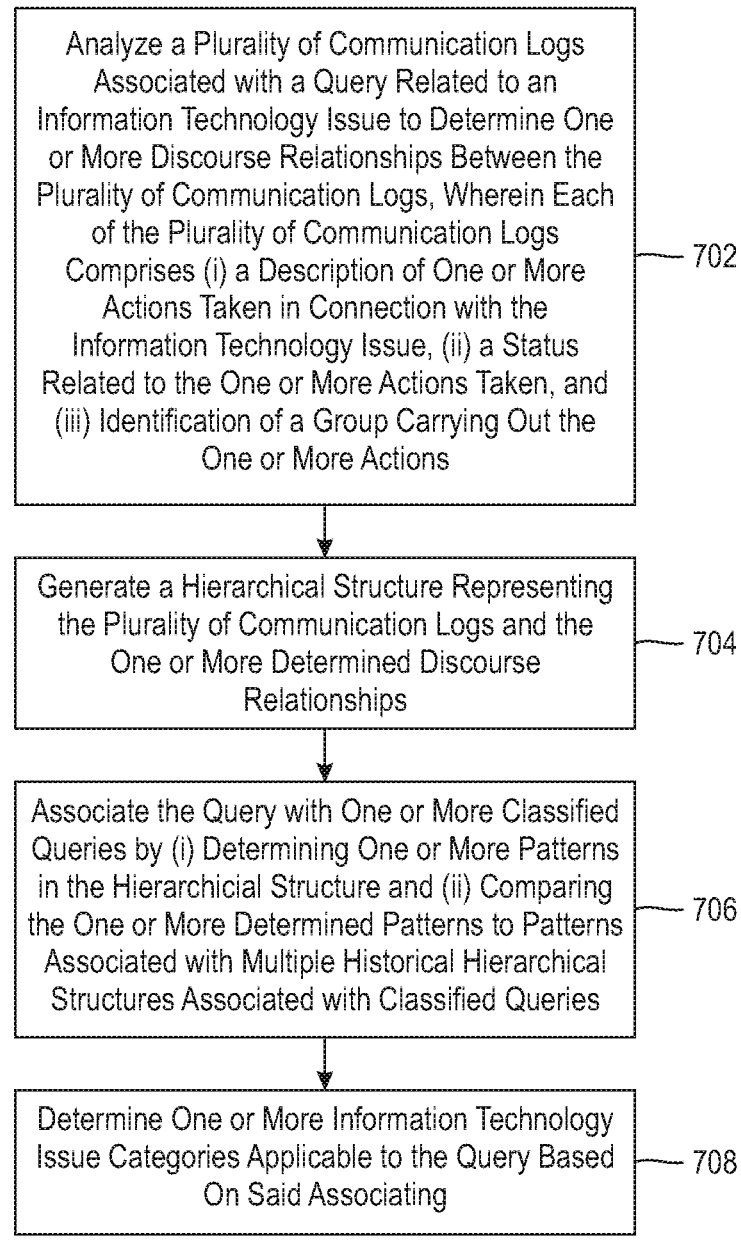
FIG. 7 is a flow diagram illustrating techniques according to an embodiment of the invention.

FIG. 7 is a flow diagram illustrating techniques according to an embodiment of the present invention. Step 702 includes analyzing a plurality of communication logs associated with a query related to an information technology issue (also referred to herein as a ticket) to determine one or more discourse relationships between the plurality of communication logs, wherein each of the plurality of communication logs comprises (i) a description of one or more actions taken in connection with the information technology issue, (ii) a status related to the one or more actions taken, and (iii) identification of a group carrying out the one or more actions.

The discourse relationships can include at least a contrast relationship, wherein, in the hierarchical structure, if an edge between a first vertex directed towards a second vertex comprises a contrast relationship, then an entity associated with the second vertex is unlikely to be applicable to the query. Also, the discourse relationships can include at least an enrichment relationship, wherein, in the hierarchical structure, if an edge between a first vertex and a second vertex comprises an enrichment relationship, then (i) an entity associated with the first vertex and (ii) an entity associated with the second vertex are both unlikely to be applicable to the query.

The discourse relationships can also include at least a uni-directional existence relationship, wherein, in the hierarchical structure, if an edge between a first vertex directed towards a second vertex comprises a uni-directional existence relationship, then an entity associated with the second vertex is more likely to be applicable to the query than is an entity associated with the first vertex. Additionally, the discourse relationships can include at least an independence relationship, wherein, in the hierarchical structure, if an edge between a first vertex and a second vertex comprises an independent relationship, then (i) an entity associated with the first vertex and (ii) an entity associated with the second vertex neither support nor contradict each other.

Step 704 includes generating a hierarchical structure representing the plurality of communication logs and the one or more determined discourse relationships. The hierarchical structure can include a log reliability graph.

Step 706 includes associating the query with one or more classified queries by (i) determining one or more patterns in the hierarchical structure and (ii) comparing the one or more determined patterns to patterns associated with multiple historical hierarchical structures associated with classified queries. In at least one embodiment of the invention, the one or more patterns in the hierarchical structure can include one or more sub-graphs of the log reliability graph. Also, associating can include implementing a learning model.

Determining patterns can include determining one or more patterns from the perspective of group carrying out the one or more actions.

Step 708 includes determining one or more information technology issue categories (problem categories) applicable to the query based on said associating.

The techniques depicted in FIG. 7 can also include measuring contextual importance of each of the plurality of communication logs using the hierarchical structure. Additionally, at least one embodiment of the invention can include identifying one or more features of one or more of the plurality of communication logs based on the one or more determined patterns. The features can include at least (i) likely group carrying out the one or more actions, (ii) likely issue category, (iii) unlikely group carrying out the one or more actions, and (iv) unlikely issue category.

Also, an additional embodiment of the invention includes normalizing text of multiple communication logs associated with a query related to an information technology issue, wherein each of the multiple communication logs comprises (i) a description of one or more actions taken in connection with the information technology issue, (ii) a status related to the one or more actions taken, and (iii) identification of a group carrying out the one or more actions. Such an embodiment can also include analyzing the multiple normalized communication logs to determine multiple discourse relationships between the multiple normalized communication logs, and associating the query with one or more historical classified queries by (i) determining one or more features in the multiple determined discourse relationships and (ii) comparing the one or more determined features to features associated with multiple historical classified queries. Further, such an embodiment can include determining one or more information technology issue categories applicable to the query based on said associating.

The techniques depicted in FIG. 7 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 8:
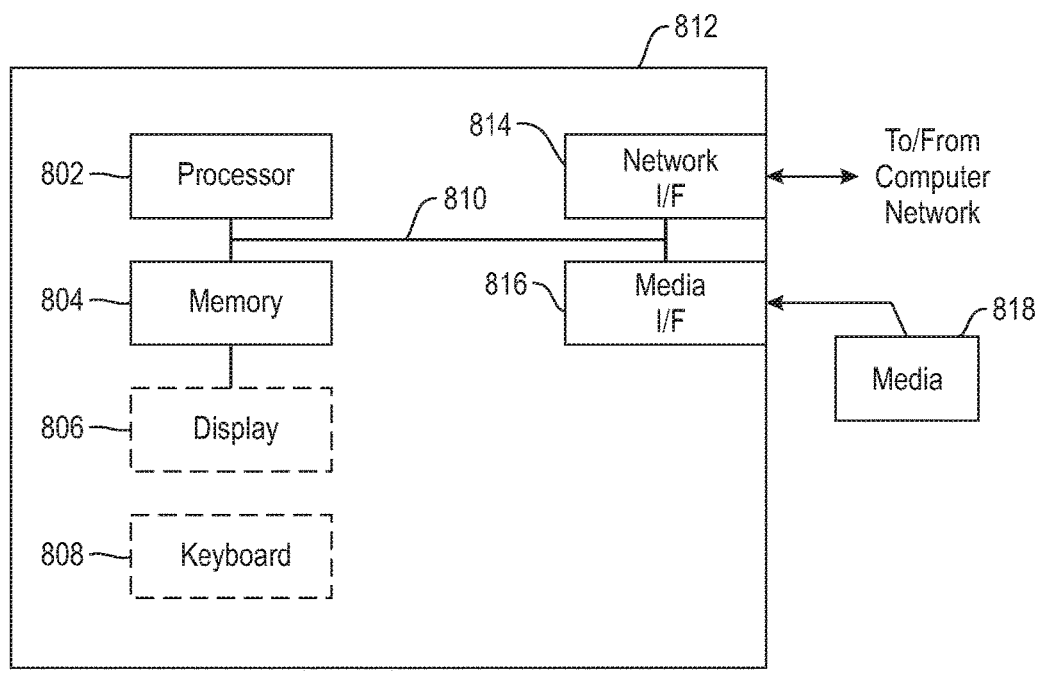
FIG. 8 is a system diagram of an exemplary computer system on which at least one embodiment of the invention can be implemented.

Additionally, an embodiment of the present invention can make use of software running on a computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812.

Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 802. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, analyzing tickets using discourse cues in communication logs.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    analyzing a plurality of communication logs associated with a query related to an information technology issue to determine one or more discourse relationships between the plurality of communication logs, wherein each of the plurality of communication logs comprises (i) a description of one or more actions taken in connection with the information technology issue, (ii) a status related to the one or more actions taken, and (iii) identification of a group carrying out the one or more actions;
    generating a hierarchical structure representing the plurality of communication logs and the one or more determined discourse relationships, wherein said generating the hierarchical structure comprises generating a discourse graph representing the plurality of communication logs and the one or more determined discourse relationships, wherein individual log entities form vertices of the discourse graph and the one or more determined discourse relationships form one or more directed edges in the discourse graph;
    deriving a log reliability graph from the discourse graph by assigning each of the plurality of communication logs in the discourse graph a weight, wherein the weight indicates an amount contextual similarity of the communication log's description with the query;
    associating the query with one or more classified queries by (i) determining one or more patterns in the log reliability graph and (ii) comparing the one or more determined patterns to patterns associated with multiple historical log reliability graphs associated with classified queries; and
    determining one or more information technology issue categories applicable to the query based on said associating;
    wherein the steps are carried out by at least one computing device.

2. The computer-implemented method of claim 1, wherein the one or more patterns in the log reliability graph comprise one or more sub-graphs of the log reliability graph.

3. The computer-implemented method of claim 1, comprising:
    measuring contextual importance of each of the plurality of communication logs using the log reliability graph.

4. The computer-implemented method of claim 1, wherein the one or more discourse relationships comprise at least a contrast relationship, wherein, in the hierarchical structure, if an edge between a first vertex directed towards a second vertex comprises a contrast relationship, then an entity associated with the second vertex is unlikely to be applicable to the query.

5. The computer-implemented method of claim 1, wherein the one or more discourse relationships comprise at least an enrichment relationship, wherein, in the hierarchical structure, if an edge between a first vertex and a second vertex comprises an enrichment relationship, then (i) an entity associated with the first vertex and (ii) an entity associated with the second vertex are both unlikely to be applicable to the query.

6. The computer-implemented method of claim 1, wherein the one or more discourse relationships comprise at least a uni-directional existence relationship, wherein, in the hierarchical structure, if an edge between a first vertex directed towards a second vertex comprises a uni-directional existence relationship, then an entity associated with the second vertex is more likely to be applicable to the query than is an entity associated with the first vertex.

7. The computer-implemented method of claim 1, wherein the one or more discourse relationships comprise at least an independence relationship, wherein, in the hierarchical structure, if an edge between a first vertex and a second vertex comprises an independent relationship, then (i) an entity associated with the first vertex and (ii) an entity associated with the second vertex neither support nor contradict each other.

8. The computer-implemented method of claim 1, wherein said determining one or more patterns comprises determining the one or more patterns from the perspective of group carrying out the one or more actions.

9. The computer-implemented method of claim 1, comprising:
identifying one or more features of one or more of the plurality of communication logs based on the one or more determined patterns.

10. The computer-implemented method of claim 9, wherein said one or more features comprises at least (i) a likely group carrying out the one or more actions, (ii) a likely issue category, (iii) an unlikely group carrying out the one or more actions, and (iv) an unlikely issue category.

11. A computer program product comprising a computer readable storage medium having program instructions embodied therewith, the program instructions executable by a device to cause the device to:
analyze a plurality of communication logs associated with a query related to an information technology issue to determine one or more discourse relationships between the plurality of communication logs, wherein each of the plurality of communication logs comprises (i) a description of one or more actions taken in connection with the information technology issue, (ii) a status related to the one or more actions taken, and (iii) identification of a group carrying out the one or more actions;
generate a hierarchical structure representing the plurality of communication logs and the one or more determined discourse relationships, wherein said generating the hierarchical structure comprises generating a discourse graph representing the plurality of communication logs and the one or more determined discourse relationships, wherein individual log entities form vertices of the discourse graph and the one or more determined discourse relationships form one or more directed edges in the discourse graph;
derive a log reliability graph from the discourse graph by assigning each of the plurality of communication logs in the discourse graph a weight, wherein the weight indicates an amount contextual similarity of the communication log's description with the query;
associate the query with one or more classified queries by (i) determining one or more patterns in the log reliability graph and (ii) comparing the one or more determined patterns to patterns associated with multiple historical log reliability graphs associated with classified queries; and
determine one or more information technology issue categories applicable to the query based on said associating.

12. The computer program product of claim 11, wherein the program instructions further cause the device to:
measure contextual importance of each of the plurality of communication logs using the log reliability graph.

13. The computer program product of claim 11, wherein the one or more discourse relationships comprise at least a contrast relationship, wherein, in the hierarchical structure, if an edge between a first vertex directed towards a second vertex comprises a contrast relationship, then an entity associated with the second vertex is unlikely to be applicable to the query.

14. The computer program product of claim 11, wherein the one or more discourse relationships comprise at least an enrichment relationship, wherein, in the hierarchical structure, if an edge between a first vertex and a second vertex comprises an enrichment relationship, then (i) an entity associated with the first vertex and (ii) an entity associated with the second vertex are both unlikely to be applicable to the query.

15. The computer program product of claim 11, wherein the one or more discourse relationships comprise at least a uni-directional existence relationship, wherein, in the hierarchical structure, if an edge between a first vertex directed towards a second vertex comprises a uni-directional existence relationship, then an entity associated with the second vertex is more likely to be applicable to the query than is an entity associated with the first vertex.

16. The computer program product of claim 11, wherein the one or more discourse relationships comprise at least an independence relationship, wherein, in the hierarchical structure, if an edge between a first vertex and a second vertex comprises an independent relationship, then (i) an entity associated with the first vertex and (ii) an entity associated with the second vertex neither support nor contradict each other.

17. The computer program product of claim 11, wherein said determining one or more patterns comprises determining the one or more patterns from the perspective of group carrying out the one or more actions.

18. A system comprising:
a memory; and
at least one processor coupled to the memory and configured for:
analyzing a plurality of communication logs associated with a query related to an information technology issue to determine one or more discourse relationships between the plurality of communication logs, wherein each of the plurality of communication logs comprises (i) a description of one or more actions taken in connection with the information technology issue, (ii) a status related to the one or more actions taken, and (iii) identification of a group carrying out the one or more actions;
generating a hierarchical structure representing the plurality of communication logs and the one or more determined discourse relationships, wherein said generating the hierarchical structure comprises generating a discourse graph representing the plurality of communication logs and the one or more determined discourse relationships, wherein individual log entities form vertices of the discourse graph and the one or more determined discourse relationships form one or more directed edges in the discourse graph;

deriving a log reliability graph from the discourse graph by assigning each of the plurality of communication logs in the discourse graph a weight, wherein the weight indicates an amount contextual similarity of the communication log's description with the query;

associating the query with one or more classified queries by (i) determining one or more patterns in the log reliability graph and (ii) comparing the one or more determined patterns to patterns associated with multiple historical log reliability graphs associated with classified queries; and determining one or more information technology issue categories applicable to the query based on said associating.

19. A computer-implemented method, comprising:

normalizing text of multiple communication logs associated with a query related to an information technology issue, wherein each of the multiple communication logs comprises (i) a description of one or more actions taken in connection with the information technology issue, (ii) a status related to the one or more actions taken, and (iii) identification of a group carrying out the one or more actions;

analyzing the multiple normalized communication logs to determine multiple discourse relationships between the multiple normalized communication logs;

generating a discourse graph representing the multiple normalized communication logs and the one or more determined discourse relationships, wherein individual log entities form vertices of the discourse graph and the one or more determined discourse relationships form one or more directed edges in the discourse graph;

deriving a log reliability graph from the discourse graph by assigning each of the multiple normalized communication logs in the discourse graph a weight, wherein the weight indicates an amount contextual similarity of the normalized communication log's description with the query;

associating the query with one or more historical classified queries by (i) determining one or more features in the log reliability graph and (ii) comparing the one or more determined features to features associated with multiple historical log reliability graph; and determining one or more information technology issue categories applicable to the query based on said associating;

wherein the steps are carried out by at least one computing device.

* * * * *